(12) United States Patent
Winsor et al.

(10) Patent No.: US 12,111,557 B1
(45) Date of Patent: Oct. 8, 2024

(54) DIFFRACTIVE BEAM STEERING SYSTEM WITH HIGH EFFICIENCY

(71) Applicants: Beam Engineering for Advanced Measurements Co., Orlando, FL (US); Defense Advanced Research Projects Agency, Arlington, VA (US)

(72) Inventors: Robert Winsor, Hamilton, VA (US); Paul Calhoun, Washington, DC (US); David Roberts, Apopka, FL (US); Nelson Tabirian, Winter Park, FL (US)

(73) Assignees: Beam Engineering for Advanced Measurements Co., Orlando, FL (US); Defense Advanced Research Projects Agency (DARPA), Arlington, VA (US)

( * ) Notice: Subject to any disclaimer, the term of this patent is extended or adjusted under 35 U.S.C. 154(b) by 0 days.

(21) Appl. No.: 18/217,853

(22) Filed: Jul. 3, 2023

(51) Int. Cl.
*G02F 1/29* (2006.01)
*H01S 3/00* (2006.01)

(52) U.S. Cl.
CPC ............ *G02F 1/292* (2013.01); *H01S 3/0071* (2013.01)

(58) Field of Classification Search
CPC ............ G02B 27/4272; G02B 26/0808; G02B 5/1833; G02B 27/4233; G02B 27/4205; G02B 27/4261; G02B 27/0944; G02B 5/1828; G02B 26/0875; G02F 1/292
See application file for complete search history.

(56) References Cited

U.S. PATENT DOCUMENTS

| | | | |
|---|---|---|---|
| 9,557,456 B2 | 1/2017 | Tabirian et al. | |
| 9,617,205 B2 | 4/2017 | Tabirian et al. | |
| 9,658,512 B2 | 5/2017 | Tabirian et al. | |
| 9,715,048 B2 | 7/2017 | Tabirian et al. | |
| 9,983,479 B2 | 5/2018 | Tabirian et al. | |
| 10,031,424 B2 | 7/2018 | Tabirian et al. | |
| 10,036,886 B2 | 7/2018 | Tabirian et al. | |
| 10,423,045 B2 | 9/2019 | Roberts et al. | |
| 11,175,441 B1 | 11/2021 | Tabirian | |
| 11,294,240 B2 | 4/2022 | Tabirian | |
| 11,366,254 B2 | 6/2022 | Tabirian | |
| 2015/0276997 A1 * | 10/2015 | Tabirian ............... | G02B 5/1828 359/573 |
| 2016/0033695 A1 * | 2/2016 | Tabirian ............. | G02B 27/4272 359/558 |

(Continued)

FOREIGN PATENT DOCUMENTS

WO   WO-2021037577 A1 *  3/2021  ......... G02B 26/0808

OTHER PUBLICATIONS

Bernet, English translation for WO-2021037577-A1 (Year: 2021).*

(Continued)

*Primary Examiner* — Jonathan Y Jung
(74) *Attorney, Agent, or Firm* — Brian S. Steinberger; Hilary F. Steinberger; Steinberger IP Law

(57) ABSTRACT

Opto-mechanical assemblies, systems, devices and methods for pointing laser and other optical beams, and for directing the field of view of sensors are disclosed. The assemblies consist of thin rotating optical elements of a type that diffracts the optical beam over a wide field of regard in two dimensions, and the angle of incidence of the optical beam or line of sight impinging on the optical elements are dynamically controlled maximizing the diffraction efficiency of the optical elements.

5 Claims, 16 Drawing Sheets

(56) References Cited

U.S. PATENT DOCUMENTS

2020/0025986 A1* 1/2020 Tabirian .................. G02C 7/12
2020/0096689 A1* 3/2020 Tam ..................... G02B 5/3016

OTHER PUBLICATIONS

N. Tabiryan, D. Roberts, D. Steeves, and B. Kimball, "4G Optics: New Technology Extends Limits to the Extremes," Photonics Spectra, Mar. 2017, pp. 46-50, 5 pages.

Tabirian, Nelson V. et al., Size, weight, and power breakthrough in non-mechanical beam and line-of-sight steering with geo-phase optics, Applied Optics, Sep. 1, 2021, vol. 60, No. 25, 8 pages.

Tabiryan, Nelson V. et al., Advances in Transparent Planar Optics: Enabling Large Aperature, Ultrathin Lenses, Advanced Optical Materials, 2021, 24 pages.

Tabiryan, Nelson V. et al., Electrically switchable large, thin, and fast optics, OSA Imaging and Applied Optics, 2018, 2 pages.

Roberts, David E. et al., Switchable, broadband, polarization-independent diffractive optical components and systems, OSA Imaging and Applied Optics, 2018, 2 pages.

Roberts, David et al., Overcoming the tradeoff between efficiency and bandwidth for vector vortex waveplates, IEEE Aerospace Conference, 2019, 13 pages.

Roberts, David et al., Chromatic aberration corrected switchable optical systems, Liquid Crystals XXII, Proc. of SPIE, vol. 10735, 2018, 10 pages.

Roberts, D. et al., "Polarization-Independent Diffractive Waveplate Optics," Mar. 2018, IEEE Aerospace Conference, 11 pages.

De Sio, Luciano et al., "Beam shaping diffractive wave plates", Applied Optics, Jan. 1, 2018, vol. 57, No. 1, 4 pages.

Serak, S. V. et al. "High contrast, low voltage variable reflector for unpolarized light", Molecular Crystals and Liquid Crystals, 2017, 12 pages.

Ouskova, Elena et al., "Diffractive waveplates for long wave infrared", Proc. of SPIE, vol. 10194, 2017, 10 pages.

Vernon, J., et al., Recording Polarization Gratings with a Standing Spiral Wave, Applied Physics Letters, Oct. 2013, vol. 103, 4 pages.

Marshall, K. L. et al., "Liquid crystal near-IR laser beam shapers employing photoaddressable alignment layers for high-peak-power applications", Liquid Crystals XVII, Proc. of SPIE, vol. 8828, 2013, 13 pages.

Serak, Svetlana V. et al., "All-optical diffractive/transmissive switch based on coupled cycloidal diffractive waveplates", Optics Express, vol. 20, No. 5, 2012, 10 pages.

Tabiryan, Nelson V. et al., "Transparent thin film polarizing and optical control systems", AIP Advances 1, 2011, 11 pages.

De Sio, Luciano et al., "Optically controlled holographic beam splitter", Applied Physics Letters, vol. 97, 2010, 3 pages.

Kimball, Brian R. et al., "Advances in Anisotropic Materials for Optical Switching", Proceedings of the 27th Army Science Conference, 2010, 8 pages.

Tabiryan, et al., The Promise of Diffractive Waveplates, OPN Optics and Photonics News, Mar. 2010, 6 pages.

Nersisyan, et al., Optical Axis Gratings in Liquid Crystals and Their Use for Polarization Insensitive Optical Switching, Journal of Nonlinear Optical Physics & Materials, vol. 18, No. 1, 2009, 47 pages.

Hrozhyk, Uladzimir et al., "Optical switching of liquid-crystal polarization gratings with nanosecond pulses", Optics Letters, vol. 34, No. 17, 2009, 3 pages.

Nersisyan, et al., Characterization of optically imprinted polarization gratings, Applied Optics, vol. 48, No. 21, Jul. 20, 2009, 6 pages.

Nersisyan, et al., Polarization insensitive imaging through polarization gratings, Optics Express, vol. 17, No. 3, Feb. 2, 2009, 14 pages.

Serak, S., et al., High-efficiency 1.5 mm Thick Optical Axis Grating and its Use for Laser Beam Combining, Optical Society of America, vol. 32, No., Jan. 2007, 4 pages.

Sarkissian, et al., Polarization-Controlled Switching Between Diffraction Orders in Transverse-Periodically Aligned Nematic Liquid Crystals, Optics Letters, Aug. 2006, abstract, 4 pages.

* cited by examiner

100

DIFFRACTIVE BEAM STEERING SYSTEM WITH HIGH EFFICIENCY

GOVERNMENT LICENSE RIGHTS

This invention was made with government support under Contract No. 140D0422C0007 awarded by the Defense Advanced Research Projects Agency. The government has certain rights in this invention.

FIELD OF THE INVENTION

This invention relates generally to the field of optics, and in particular to diffractive optical structures, devices, systems, methods, and processes which are used to steer a beam of electromagnetic radiation.

BACKGROUND OF THE INVENTION

Many modern technologies require steering of optical beams. The applications include LiDARs, optical communication, laser material processing, laser weapons, projection displays, etc. One of the methods of steering an optical beam is by means of a pair of wedge prisms whose rotational position can be varied, thereby varying the angle over which the optical beam is deflected. The refractive prisms comprising such pairs of wedge prisms are often referred to as Risley prisms. While Risley prisms are considered optimal in some applications, their use is not practical in other applications due to such factors as the weight of the prisms, the imbalance they introduce in the rotary apertures, and the availability of suitable refractive materials in the needed sizes to support the desired aperture dimensions. Large prism size results in a need for powerful motors to rotate the prisms and high motor torque to achieve desired steering speed. These problems become especially important as the aperture sizes increase. For a given optical material, operating wavelength or wavelength band, and for the given beam deflection angle, the weight and volume of each prism in a Risley prism pair increases as the cube of the aperture dimension. For example, in order to double the aperture diameter, the weight and volume of each of the prisms must increase by a factor of eight. This unfavorable scaling of weight and volume, as well as the problems of cost and availability of suitable optical materials with sufficient size, prevents the use of Risley prisms in applications requiring large aperture dimensions.

Risley prisms deflect electromagnetic radiation by refraction. It is well known in the art that a pair of transmissive diffraction gratings can also be used to deflect an optical beam. By rotating each diffractive beam deflector independently, it is possible to steer an optical beam over an extended, contiguous area of regard, transmitting it through a pair of diffractive beam deflectors. The use of diffractive beam deflectors eliminates the unfavorable scaling of weight and volume with aperture size that is characteristic of refractive prims.

An optical component or combination of components that changes the direction of propagation of an optical beam by diffracting it, without means to control the rotational position of the optical component or combination of components, will be referred to herein as a diffractive optic. The combination of a diffractive optic with a rotary actuator to control its rotational position will be referred to herein as a diffractive beam deflector. Combinations of two diffractive beam deflectors, configured to deflect an optical beam in two angular axes, will be referred to herein as a diffractive beam steering system. For the invention disclosed herein, the rotary actuator used to control the rotational position of the diffractive optic will be an electric motor that consists of a rotor, the part of the motor that rotates, and a stator, the part of the motor that does not rotate, together with an electrical system for driving the motor.

The diffraction efficiency of diffractive optics varies with the angle of incidence. This results in a dependence of the fraction of light deflected into the desired direction on the angle through which the optical beam is deflected. Beam deflection systems based on prior art, employing diffractive beam deflectors, all suffer from some dependence of the fraction of light diffracted into the desired direction on the angle through which the light is diffracted. It is highly desirable to maximize the fraction of light deflected by a system of diffractive beam deflectors into the desired direction.

Unlike alternative beam deflection methods such as gimballed mirrors, prior art beam deflection systems based on either Risley prisms or on diffractive beam deflectors may affect the cross-sectional profile of the optical beam. For example, if the optical beam at the input to the beam deflector has a circular cross section, the optical beam at the output from the beam deflector may form an elliptical cross section. The ellipticity of the output beam typically will increase as the angle between the direction of propagation of the beam at the input to the beam deflector and the direction of propagation of the beam at the output from the beam deflector increases. While in some applications, this change in the shape of the beam cross section is acceptable, in many other applications it is undesirable for various reasons. One of these reasons is that when the beam is converted from a circular cross section to an elliptical cross section, the power density (that is, optical power per unit area) typically increases. Another of these reasons is that when the beam is converted from a circular cross section to an elliptical cross section, the far-field divergence in one axis typically increases, and the far-field beam cross section becomes asymmetrical.

Additionally, the efficiency and even the deflection angle may depend on polarization state of the optical beam, a phenomenon that is strongly exhibited, particularly, for diffractive waveplates.

Thus, there is a need for optical beam steering systems that are thin and lightweight, have high optical efficiency independent of polarization state, and do not significantly change the cross section of the optical beam as a result of deflection.

SUMMARY OF THE INVENTION

The first objective of the present invention is to provide optical beam steering systems, assemblies, devices and methods that are thin and lightweight, and that have high efficiency over the entire range of accessible beam deflection angles.

The second objective of the present invention is to provide high-efficiency, thin and lightweight beam steering systems, assemblies, devices and methods for unpolarized optical beams.

The third objective of the present invention is to provide thin and lightweight beam steering systems, assemblies, devices and methods that do not significantly change the cross section of the optical beams as a result of beam deflection.

Many of the exemplary applications have been described herein with terms such as "optical beams" and "light" being used to describe electromagnetic radiation that is acted upon by the disclosed diffractive structures. The terms "optical beams" and "light" in this context should not be taken to restrict the scope of the disclosed embodiments to only those in which the electromagnetic radiation acted upon or manipulated by the diffractive structures is in the visible region of the electromagnetic spectrum.

As will be evident to those skilled in the art, the exemplary embodiments disclosed here, in addition to being applicable in the visible region of the spectrum, are equally applicable to the microwave, infrared, ultraviolet, and X-ray regions of the spectrum.

Further objectives and advantages of this invention will be apparent from the following detailed description of the presently preferred embodiments which are illustrated schematically in the accompanying drawings.

DETAILED DESCRIPTION OF THE INVENTION

Figure 1:
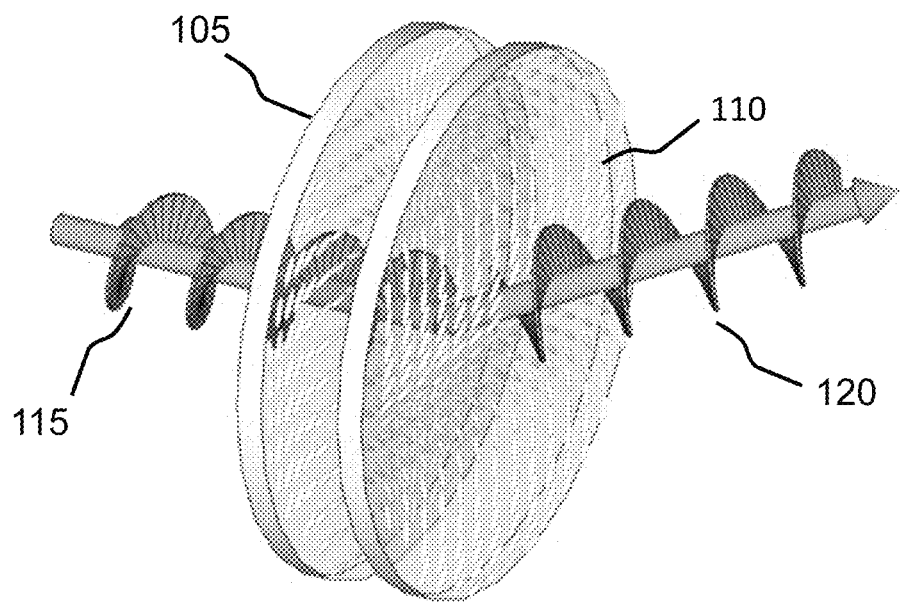
FIG. 1 shows a prior art diffractive beam steering system, which deflects an optical beam into a direction of propagation that depends on the angular position of each of two rotating diffractive beam deflectors. The rotary actuators used to control the rotational positions of the diffractive optics are not included in FIG. 1.

Before explaining the disclosed embodiments of the present invention, it is to be understood that the invention is not limited in its applications to the details of the particular arrangements shown since the invention is capable of other embodiments. Also, the terminology used herein is for the purpose of description and not of limitation. In the Summary of the Invention above and in the accompanying drawings, reference is made to particular features of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described in more detail with reference to the accompanying drawings, in which preferred embodiments of the invention are shown. This invention can, however, be embodied in many different forms and should not be construed as limited to the embodiments set forth herein. Rather, these embodiments are provided so that this disclosure will be thorough and complete, and will convey the scope of the invention to those skilled in the art. Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Figure 2:
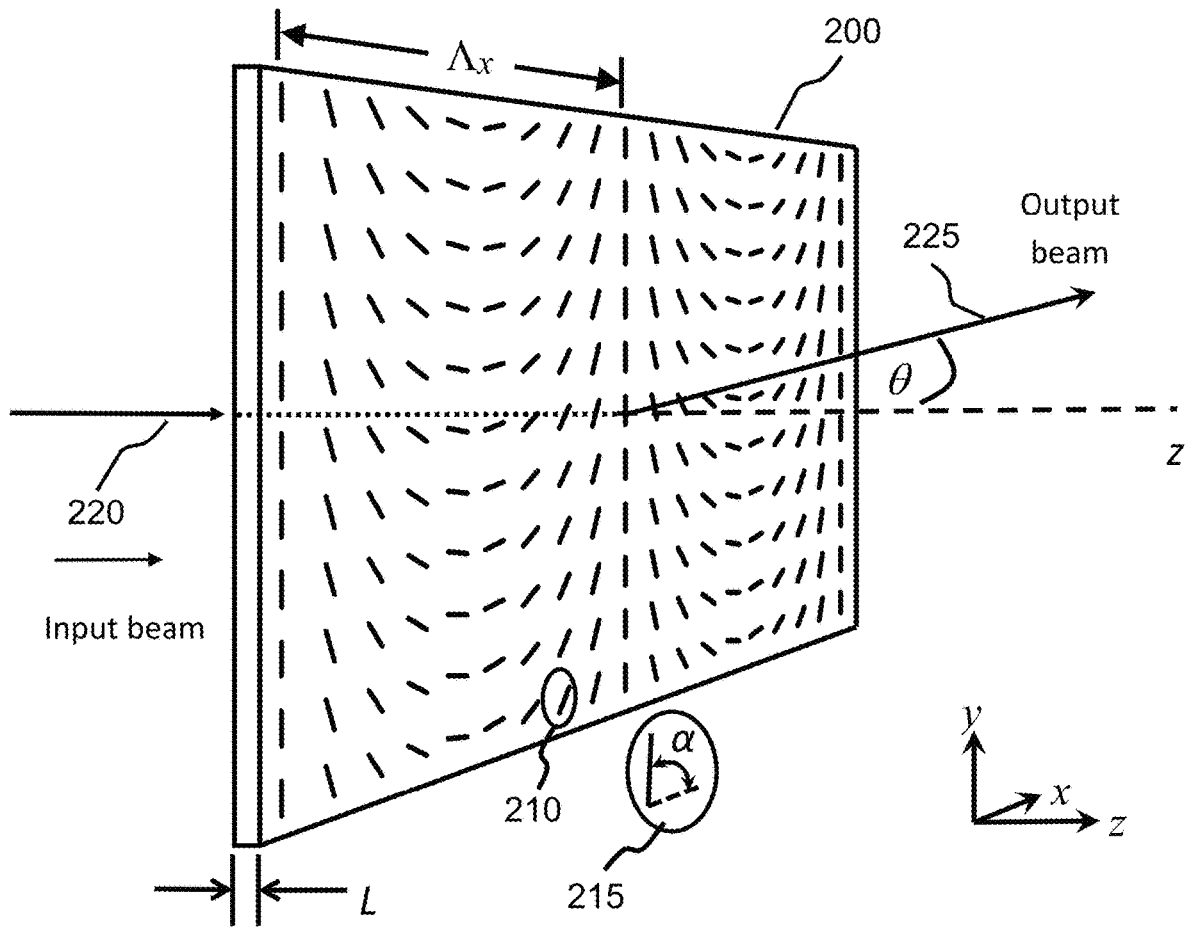
FIG. 2 shows the variation of the optical anisotropy axis orientation with position for a cycloidal diffractive waveplate, using prior art.

In the descriptions, it will be helpful to have definitions of the terms "uniform cycloidal diffractive waveplate" (abbreviated as U-CDW) and "twisted cycloidal diffractive waveplate" (abbreviated as T-CDW). Each of these is a type of cycloidal diffractive waveplate (CDW), a diffractive waveplate structure employed in each of the two round planar diffractive structures 105 and 110 illustrated in FIG. 1, and with a planar structure 200 illustrated in FIG. 2. Both U-CDWs and T-CDWs are described by the local orientation angle α of the birefringence axis 210 of the anisotropic material comprising the CDW as illustrated in FIG. 2 for a particular location in the CDW. The spatial variation of the orientation angle α of the birefringence axis of a CDW is determined by the following formula:

$$\alpha = \alpha_0 \pm \frac{\pi x}{\Lambda_x} \pm \frac{\pi z}{\Lambda_z} \qquad (I)$$

where $\alpha_0$ is a constant that can be set to zero at a particular value of x; $\Lambda_x$ is the period of the CDW in the x direction parallel to the plane of the CDW, and $\Lambda_z$ determines the angle of rotation of the birefringence axis of the CDW in the z direction which is perpendicular to the plane of the CDW.

The signs in formula (I) are determined by the orientation of the CDW with respect to the x and z coordinates. The difference between a U-CDW and a T-CDW is that $\Lambda_z$ is infinite for a U-CDW, and it is finite for a T-CDW. In other words, for a U-CDW, the orientation angle α of the birefringence axis is a function of the x-coordinate only and is independent of the z-coordinate which is along a direction perpendicular to the surface of the CDW. For a T-CDW, on the other hand, the orientation angle α of the birefringence axis depends on both the x-coordinate and the z-coordinate.

Methods have been developed for fabrication of a type of transmissive diffractive structure variously described in the literature by the terms cycloidal diffractive waveplate (CDW), polarization grating (PG), Panchanathan-Berry diffractive optical elements (PBDOE), geometric phase, or geo-phase (GP) gratings. Better understanding of the diffractive waveplate (DW) technology in the years following the earliest work in this area of technology has led to evolution of the terminology as well. Thus, "U-CDW" and "T-CDW" referred to in the current invention correspond, respectively, to "CDW" and "PVG" used, for example, in U.S. Pat. No. 11,175,441 to Tabirian et al. Methods of fabrication of diffractive waveplate lenses and mirrors are described in U.S. Pat. Nos. 10,197,715, 10,031,424, 9,658,512, and 9,617,205, all to Tabirian et al., which are assigned to one of the assignees of the subject patent application, and which are all incorporated by reference in their entirety.

Rotating CDWs for steering laser beams or field of view of sensors have been described in U.S. Pat. Nos. 10,036,886, 9,715,048, and 9,557,456, to Tabirian et al., which are all assigned to one of the assignees of the subject patent application, and which are all incorporated by reference in their entirety.

Structures based on diffractive waveplate technology, which act on light independent of the polarization of the light, are described in U.S. Pat. No. 11,175,441 to Tabirian et al., which is assigned to one of the assignees of the subject patent application, and which is incorporated by reference in its entirety.

A listing of items can now be introduced:
- 100 diffractive beam steering system, which deflects an optical beam into a direction of propagation that depends on the angular position of each of two rotating diffractive beam deflectors. The rotary actuators that are a necessary part of the diffractive beam steering system 100 are not shown in FIG. 1.
- 105 first diffractive optic
- 110 second diffractive optic
- 115 optical beam incident on the first diffractive optic; spiral indicates the circular polarization of the optical beam
- 120 optical beam after being redirected by the diffractive beam steering system
- 200 schematic of a cycloidal diffractive waveplate (CDW)
- 210 line segment illustrating the local direction of the birefringence axis in the CDW
- 215 illustration of the angle α between the x-axis and the local direction of the birefringence axis
- 220 a line along z-axis indicating the direction of propagation of a light beam incident on the CDW
- 225 a line indicating the direction of propagation of a light beam making an angle θ with respect to the z-axis after being diffracted by the CDW
- 400 a polarization-independent diffractive optic, optimized for a normally incident input optical beam
- 405 the portion of an optical beam of a first circular polarization, incident on the diffractive optic 400
- 410 the twist cycloidal diffractive waveplate (T-CDW) onto which an incoming optical beam is incident
- 415 the beam diffracted from the diffractive optic 400 that results from the portion of the optical beam incident on the diffractive optic that is of a first circular polarization
- 420 the portion of an optical beam of a second circular polarization, incident on the diffractive optic 400
- 425 the T-CDW onto which an optical beam is incident after it has been transmitted through the T-CDW 410
- 430 the beam diffracted from the diffractive optic 400 that results from the portion of the optical beam incident on said diffractive beam deflector that is of a second circular polarization
- 435 a line of constant birefringence axis orientation within T-CDW 410
- 440 a line of constant birefringence axis orientation within T-CDW 425
- 500 a diffractive optic, optimized for an input optical beam that is not normally incident
- 505 the portion of an optical beam of a first circular polarization, incident on the diffractive optic 500
- 510 the uniform cycloidal diffractive waveplate (U-CDW) onto which an incoming optical beam is incident
- 515 the beam diffracted from the diffractive optic 500 that results from the portion of the optical beam incident on said diffractive optic that is of a first circular polarization
- 520 the portion of an optical beam of a second circular polarization, incident on the diffractive optic 500
- 525 the U-CDW onto which an optical beam is incident after it has been transmitted through U-CDW 510
- 530 the beam diffracted from the diffractive optic 500 that results from the portion of the optical beam incident on said diffractive optic that is of a second circular polarization 535 a line of constant birefringence axis orientation within U-CDW 510
540 a line of constant birefringence axis orientation within U-CDW 525
600 diffractive beam deflector
610 diffractive optic
620 rotor of the diffractive beam deflector
630 stator of the diffractive beam deflector
640 rotation axis of the rotary actuator
700 diffractive beam steering system
710 first diffractive beam deflector
715 second diffractive beam deflector
720 optical beam at the input of the first diffractive beam deflector
730 optical beam deflected by the first diffractive beam deflector
735 optical beam deflected by the first diffractive beam deflector with 180
degrees of rotation compared to 730
740 optical beam at the output of the second diffractive beam deflector
750 rotation axis of the rotary actuator of the first diffractive beam deflector
755 rotation axis of the rotary actuator of the second diffractive beam deflector
760 diffractive optic, part of first diffractive beam deflector
765 diffractive optic, part of second diffractive beam deflector
800 diffractive beam steering system, consisting of a first diffractive beam deflector comprising 810, 820, and one of 830, 870, 880, or 890; and a second diffractive beam deflector comprising 815, 825, and one of 835, 875, 885, or 895.
805 a structure to which the diffractive beam steering system 800 is attached
810 the stator of the rotary actuator of the first diffractive beam deflector
815 the stator of the rotary actuator of the second diffractive beam deflector
820 the rotor of the rotary actuator of the first diffractive beam deflector
825 the rotor of the rotary actuator of the second diffractive beam deflector
830 diffractive optic, part of first diffractive beam deflector, rigidly mounted to the rotor 820. The diffractive optic 830 of the first diffractive beam deflector consists of a single layer, with an axis that is parallel to the axis of the rotor 820.
835 diffractive optic, part of second diffractive beam deflector, rigidly mounted to the rotor 825
840 an optical beam normally incident on diffractive optic 830 of the first diffractive beam deflector
850 the optical beam obtained due to diffraction of the incident beam 840 by diffractive optic 830 of the first diffractive beam deflector such that the diffracted beam is propagating in a direction normal to the diffractive optic 835 of the second diffractive beam deflector
855 the optical beam obtained due to diffraction of the beam 850 by the diffractive optic 835 of the second diffractive beam deflector
860 mechanical structure attaching the stator 815 of the second rotary actuator to the rotor 820 of the first rotary actuator
870 diffractive optic of the first polarization-independent diffractive beam deflector, rigidly mounted to the rotor 820. The diffractive optic 870 of the first diffractive beam deflector consists of two layers, with an axis that is parallel to the axis of the rotor 820.
875 diffractive optic of the second polarization-independent diffractive beam deflector, rigidly mounted to the rotor 825
880 diffractive optic of the first diffractive beam deflector, rigidly mounted to the rotor 820. The diffractive optic 880 of the first diffractive beam deflector consists of a single layer, with an axis that is tilted with respect to the axis of the rotor 820.
885 diffractive optic of the second diffractive beam deflector, rigidly mounted to the rotor 825
890 diffractive optic of the first polarization-independent diffractive beam deflector, rigidly mounted to the rotor 820. The diffractive optic 890 of the first diffractive beam deflector consists of two layers, with an axis that is tilted with respect to the axis of the rotor 820.
895 diffractive optic of the second polarization-independent diffractive beam deflector, rigidly mounted to the rotor 825
910 first diffractive beam steering system
915 second diffractive beam steering system
920 optical beam incident on the first diffractive beam steering system
930 optical beam deflected by the first diffractive beam steering system
940 optical beam deflected by the second diffractive beam steering system
950 optics controlling phase, shape and divergence of the optical beam 930
960 schematic presentation of a deformed phase profile of the beam 930
965 schematic presentation of a phase profile corrected into a concave phase profile starting from the beam 930 propagated through the optics 950
1005 first diffractive beam deflector
1010 second diffractive beam deflector
1015 second diffractive beam deflector in the state of low diffraction efficiency
1020 input optical beam incident on the first diffractive beam deflector
1025 optical beam deflected by the first diffractive beam deflector
1030 optical beam deflected by the second diffractive beam deflector
1040 optical beam not deflected by the second diffractive beam deflector
1050 electrical power source controlling diffraction efficiency of the second diffractive beam deflector
1060 defocused undiffracted beam A prior-art variant of the type of diffractive beam steering system that is the subject of the present invention is illustrated in FIG. 1 as shown in U.S. Pat. No. 9,557,456 to Tabirian et al. which is incorporated by reference in its entirety. The present invention discloses improvements to this system that allow increased efficiency and wider angular coverage than is possible with prior art, and steering unpolarized optical beams.

In FIG. 1, a circularly-polarized optical beam 115 is incident on the diffractive beam steering system 100. The spiral structures on the input beam 115 and the output beam 120 are to illustrate the circularly-polarized nature of the incident and the output beams. Both the first diffractive optic 105 and the second diffractive optic 110 can be rotated, by which means the output direction of propagation of optical beam 120 can be varied in both angular dimensions.

One type of structure that may be used to deflect an optical beam is the CDW 200 illustrated in FIG. 2. The local orientation angle α of the birefringence axis of the CDW is shown at 210 and 215 at one point of the CDW plane in FIG. 2. The spatial variation of the orientation angle of the birefringence axis results in diffraction of the input beam 220 through an angle θ into the output beam 225. For the simplest type of CDW, U-CDW, the orientation angle α of the birefringence axis depends only on one of the Cartesian coordinates in the plane of the optic, which we have chosen as the x-coordinate for the present disclosure. The birefringence axis angle α varies linearly proportional to the coordinate x for U-CDWs. High diffraction efficiency for the operating wavelength λ is achieved if the thickness L of the U-CDW is such that LΔn=λ/2 where Δn is the birefringence of the anisotropic medium comprising the CDW.

Figure 3:
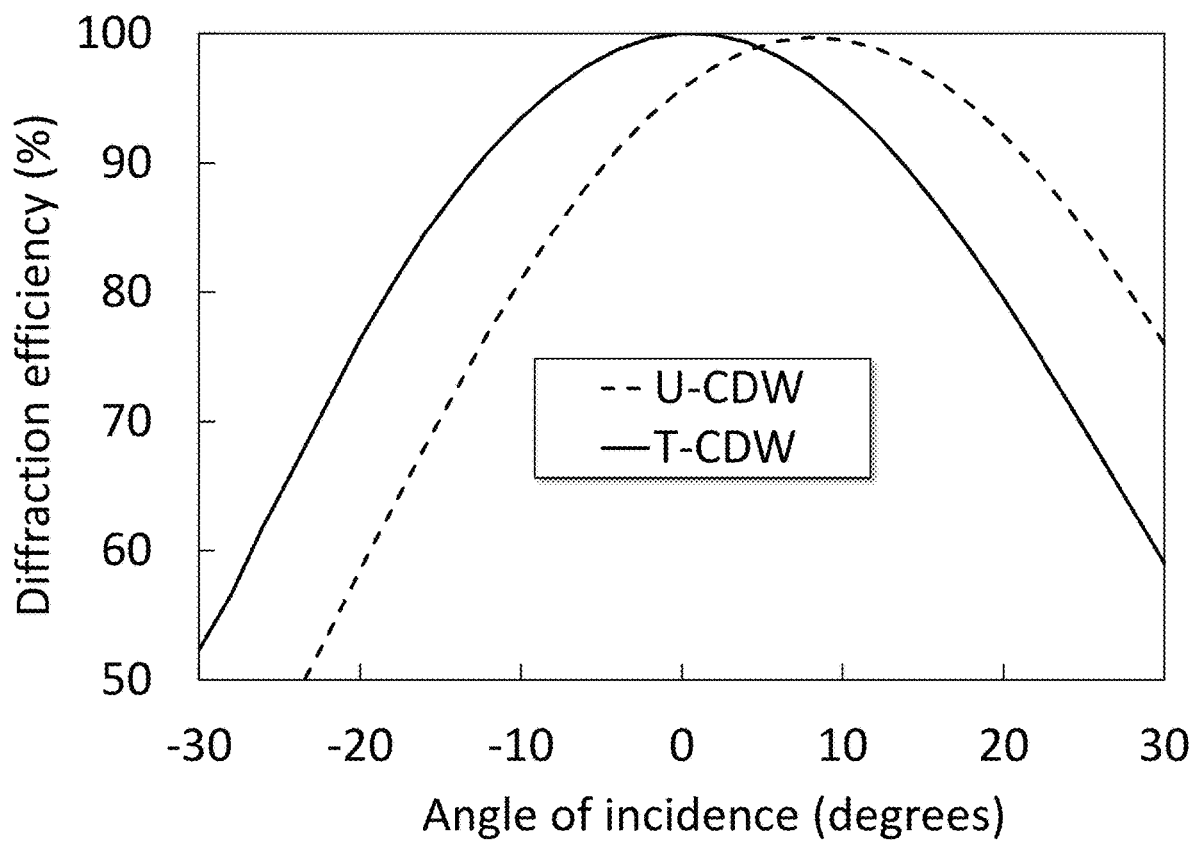
FIG. 3 shows calculations using Finite Difference Time Domain modeling of the diffraction efficiency as a function of the angle of incidence of a plane-wave optical beam for two types of diffractive waveplates using prior art.

It is known from prior art that the diffraction efficiency of U-CDWs and T-CDWs depends on angle of incidence of the beam. This is illustrated by the results shown in FIG. 3 of Finite Difference Time Domain calculations of diffraction efficiency for a U-CDW and a T-CDW. The calculations for which results are shown in FIG. 3 are for light of one particular circular polarization. The incidence angles on the horizontal axis in FIG. 3 are in a plane perpendicular to lines of constant birefringence axis orientation in the U-CDW and T-CDW, corresponding to x, z plane in FIG. 2. For the U-CDW for which results are shown in FIG. 3, the maximum diffraction efficiency is achieved at an angle of incidence of eight degrees for the particular example. For the T-CDW for which results are shown in FIG. 3, the maximum diffraction efficiency is achieved at an angle of incidence equal to zero, i.e. at normal incidence. The dependence of the angle at which the diffraction efficiency is maximized on wavelength, CDW period, and other factors is described in U.S. Pat. No. 11,175,441 to Tabirian et al.

In a diffractive beam steering system of the type shown in FIG. 1, a T-CDW could be used as the first diffractive optic 105, which would ensure that the efficiency of diffraction from the first diffractive optic 105 would be near 100% according to the calculations for which results are shown in FIG. 3. However, the angle of incidence on the second diffractive optic 110 would depend on the rotational angles of both diffractive optics 105 and 110. This would result in the overall diffraction efficiency of the diffractive beam steering system 100 depending on the direction into which the beam is deflected.

Figure 4:
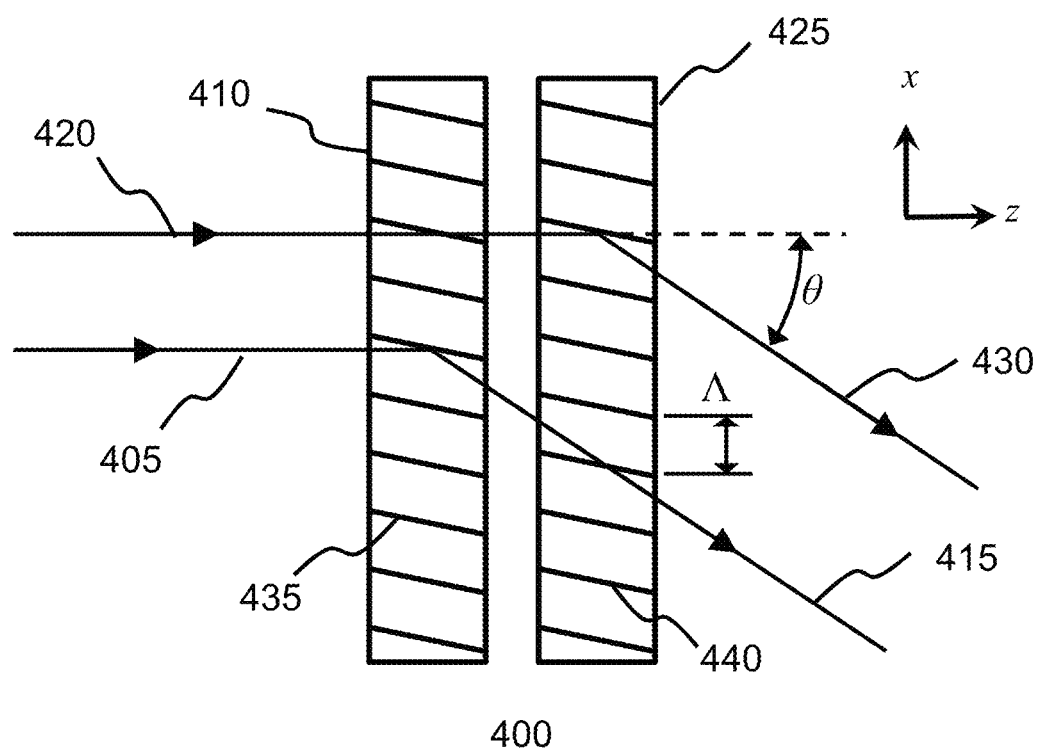
FIG. 4 shows a prior art diffractive optic, optimized for a normally incident input optical beam, consisting of two cycloidal diffractive waveplates, one which diffracts light of one handedness of circular polarization, and the other which diffracts light of the other handedness of circular polarization, using prior art.

The calculations for which results are shown in FIG. 3 are for one circular polarization of light. In many applications, it is desired to deflect an optical beam or a sensor field of view in the same direction for all polarizations of light. A diffractive optic that deflects light in the same direction for both circular polarizations is shown in FIG. 4. Since light of both circular polarizations is diffracted in the same direction by the diffractive optic 400 shown in FIG. 4, it follows that light having any polarization, or no polarization, will also be diffracted in the same direction.

In FIG. 4, 405 is the portion of the input optical beam that has one circular polarization, for example, right-hand circular polarization, and 420 is the portion of the input optical beam that has, for example, left-hand circular polarization. The T-CDW 410 with period $\Lambda_x$ in the x direction parallel to the surface of the T-CDW has the property that it diffracts portion 405 and passes portion 420 of the input beam, due to the circular polarization states of these two components of the input optical beam. The T-CDW 425 with the same period $\Lambda_x$ as T-CDW 410 has the property that it diffracts the portion 420 of the input beam, and passes the portion 405 previously diffracted by T-CDW 410. The angle through which the beam is diffracted is equal to $\theta = \sin^{-1} \lambda/\Lambda_x$ where λ is the light wavelength. The slanted lines 435 and 440 in FIG. 4 represent planes along which the birefringence axis orientation angle α is constant in a T-CDW.

The prior art diffractive optic 400 can have close to 100% diffraction efficiency for any polarization of light for normal incidence under conditions disclosed in U.S. Pat. No. 11,175,441 to Tabirian et al., which is incorporated by reference in its entirety, but the diffraction efficiency will degrade at other angles of incidence. Thus, if high diffraction efficiency is required, the angle of incidence must be kept at near zero. If the diffractive optic 400 is used as the first diffractive optic 105 in FIG. 1, the diffraction efficiency for both polarizations will be greater than approximately 99% at a selected operating wavelength. However, if the diffractive optic 400 is used as the second diffractive optic 110 in FIG. 1, the diffraction efficiency will be degraded because of the oblique incidence of the beam diffracted by the first diffractive optic on the second diffractive optic 110 in FIG. 1. Because the combination of two T-CDWs 400 diffracts light in the same direction for any polarization, it can be referred to as a polarization-independent diffractive waveplate system.

Input beams 405 and 420 with a round cross section incident on a diffractive optic 400 as is illustrated in FIG. 4 would produce output beams 415 and 430 that have an elliptical cross section compressed by a factor cos θ in the plane of diffraction, where θ is the angle through which the beam is diffracted. This is undesirable in some applications, for example in applications in which the far-field divergence is a parameter of critical importance. If a diffraction-limited beam is compressed in the near field, it will be expanded in the far field by the same factor. For example, if a round beam with diffraction-limited divergence in the far field is compressed in the plane of diffraction by a factor C in the near field due to diffraction by diffractive optic 400, it will be expanded in that same plane by the same factor C in the far field. Therefore, in applications for which it is essential that the beam remain symmetrical after deflection, diffractive optics such as 400 could not be used.

Figure 5:
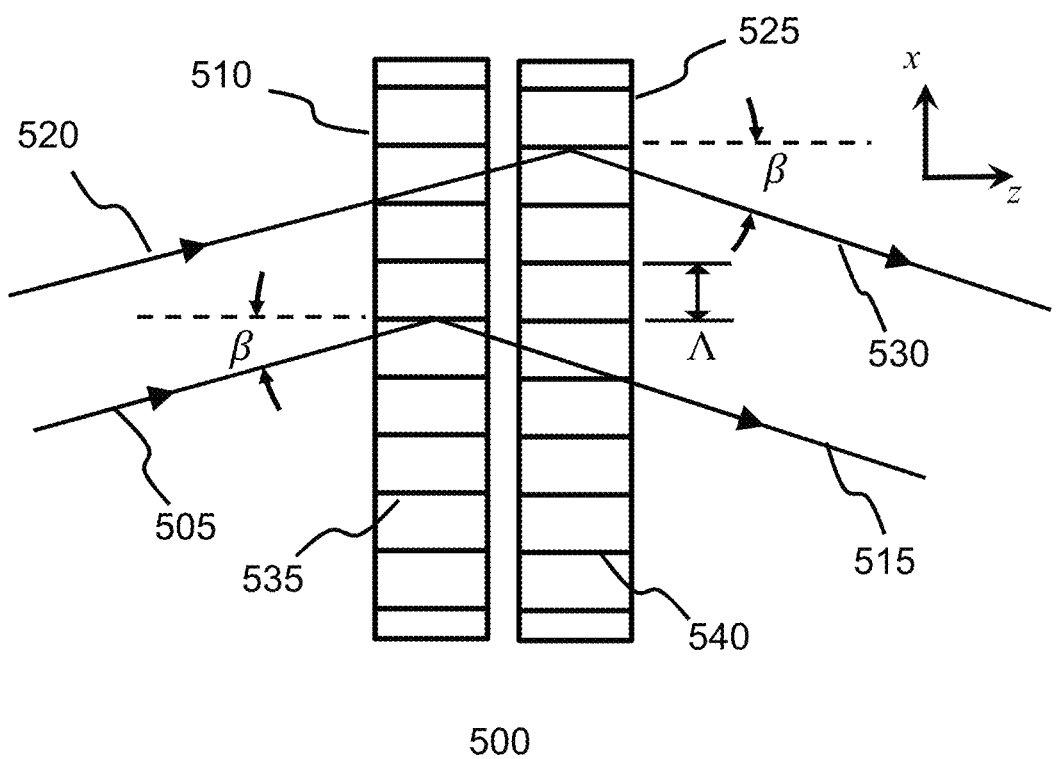
FIG. 5 shows a prior art diffractive optic, optimized for an incident input optical beam that is not normally incident, consisting of two cycloidal diffractive waveplates, one which diffracts light of one handedness of circular polarization, and the other which diffracts light of the other handedness of circular polarization, using the prior art. The angle between the direction of propagation of the input beam and a line perpendicular to the planes of both cycloidal diffractive waveplates is the same as the angle between the propagation direction of the output beam and a line perpendicular to the planes of both cycloidal diffractive waveplates.

The diffractive beam deflection technique illustrated in FIG. 5 has the property of preserving the cross section of the beam. In this figure, 500 is a diffractive optic optimized for an input optical beam that is not normally incident. The wavelength λ and period $\Lambda_x$ are selected such that the angle β between the input beams 505 and 520 and a line normal to the surfaces of the two U-CDWs comprising the diffractive optic is equal to $\beta = \sin^{-1}(\lambda/\Lambda_x)$, which is the same as the angle between the output beams 515 and 530 and a line normal to the surfaces of the two U-CDWs.

In FIG. 5, 505 is the portion of the input optical beam that has one circular polarization, and 520 is the portion of the input optical beam that has the other circular polarization. The U-CDW 510 with period $\Lambda_x$ has the property that it diffracts portion 505 and passes portion 520 of the input beam, due to the circular polarization of these two components of the optical beam. The U-CDW 525 with the same period $\Lambda_x$ as U-CDW 510 has the property that it diffracts the portion 520 of the input beam, and passes the portion 505 previously diffracted by U-CDW 510. The angle through which the beam is diffracted is given by $2\beta = 2 \cdot \sin^{-1} \lambda/2\Lambda_x$ where λ is the wavelength.

In FIGS. 5, 535 and 540 are planes of constant birefringence axis orientation. As in all U-CDWs, these planes are perpendicular to the surfaces of the U-CDW.

The prior art diffractive optic 500 can have greater than approximately 99% diffraction efficiency for any polarization of light for incidence at the Bragg angle β under conditions explained in U.S. Pat. No. 11,175,441 to Tabirian et al., which is incorporated by reference in its entirety, but the diffraction efficiency will degrade at other angles of incidence. Thus, if high diffraction efficiency is required, the angle of incidence must be kept near the Bragg angle. If the diffractive optic 500 is used as the first diffractive optic 105 in FIG. 1, the diffraction efficiency for both polarizations will be greater than approximately 99% at a selected operating wavelength and a selected non-normal angle of incidence. However, if the diffractive optic 500 is used as the second diffractive optic 110 in FIG. 1, the diffraction efficiency will be degraded because of the oblique angle of incidence on the second diffractive optic 110 in FIG. 1. Because the combination of two U-CDWs 500 diffracts light in the same direction for any polarization, it can be referred to as a polarization-independent diffractive waveplate system.

For both the diffractive optic 400 shown in FIG. 4, optimized for a normally incident input optical beam, and the diffractive optic 500 shown in FIG. 5, optimized for a non-normally incident input optical beam, the highest diffraction efficiency can only be achieved at the angle of incidence for which the diffractive optic was designed, either normal incidence for diffractive optic 400 or non-normal incidence for diffractive optic 500. A diffractive beam steering system employing diffractive optics such as 400 shown in FIG. 4 or 500 as shown in FIG. 5, so designed such that the angle of incidence is the same regardless of which direction the beam is pointed, would retain high diffraction efficiency for all pointing directions. In the preferred embodiments of the present invention, the second diffractive optic of a diffractive beam steering system is moved in such a manner that the angle of incidence on this diffractive optic maximizes diffraction efficiency for all accessible pointing directions of the diffractive beam steering system.

Figure 6:
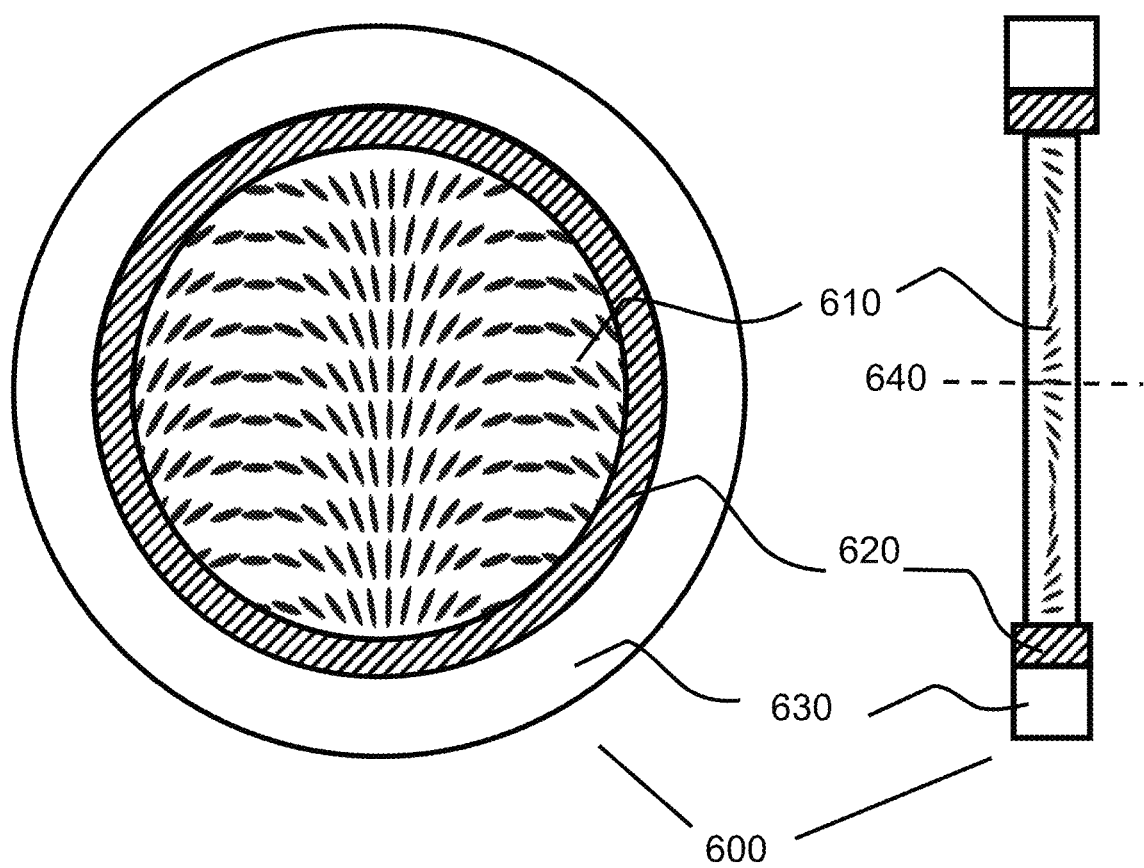
FIG. 6 shows front and side representations of a diffractive beam deflector.

In one preferred embodiment of the present invention, each of the diffractive optics is mounted into a separate rotary actuator, the rotation axes of both of the rotary actuators being parallel to the propagation directions of the incident optical beams at all rotation angles of the diffractive optics. An example of a diffractive optic mounted into a rotary actuator is shown schematically in FIG. 6. The diffractive optic 610 of diffractive beam deflector 600 can be brought into rotation around the rotation axis 640 by the rotor 620 of the rotary actuator. The stator 630 of the rotary actuator can be used to mount the rotary actuator onto another rotary actuator. FIG. 6 shows schematically the front of the diffractive beam deflector 600 that includes a diffractive optic 610, and a schematic representation of its side view. In the example shown in FIG. 6, the plane of the diffractive optic 610 is parallel to the plane of the rotary actuator. Rotary actuators are well known commercial products, particularly, in optics and are used, for example, for rotating prisms, polarizers, waveplates and other optical components. In the preferred embodiment, the diameter of the rotary actuator is at least three times larger than its thickness.

Figure 7A:
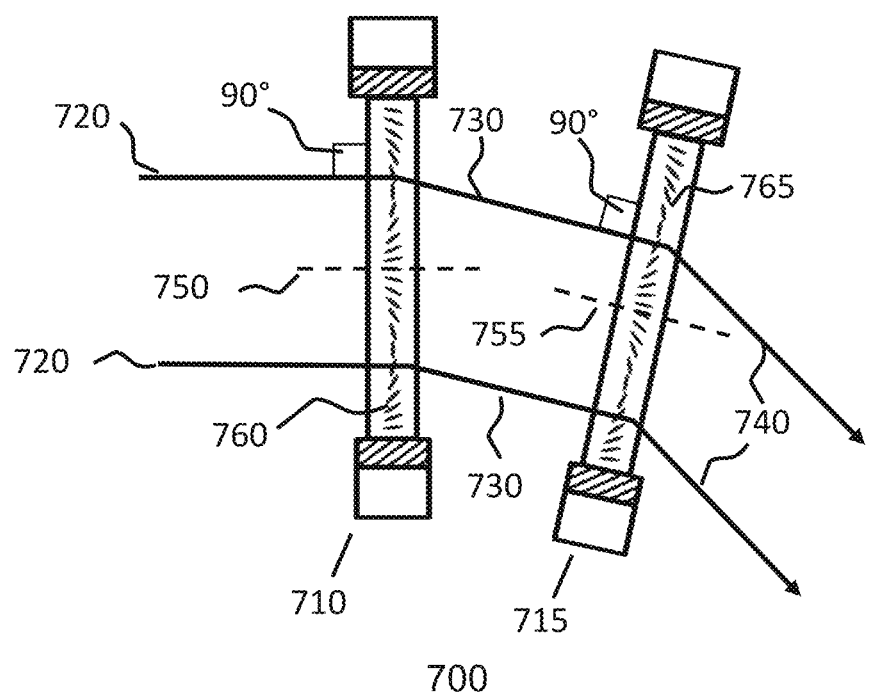
FIGS. 7A, 7B and 7C show a diffractive beam steering system in which the input optical beam is normally incident on the first diffractive optic it encounters, and is also normally incident on the second diffractive optic it encounters, after being diffracted by the first diffractive optic.
Figure 7B:
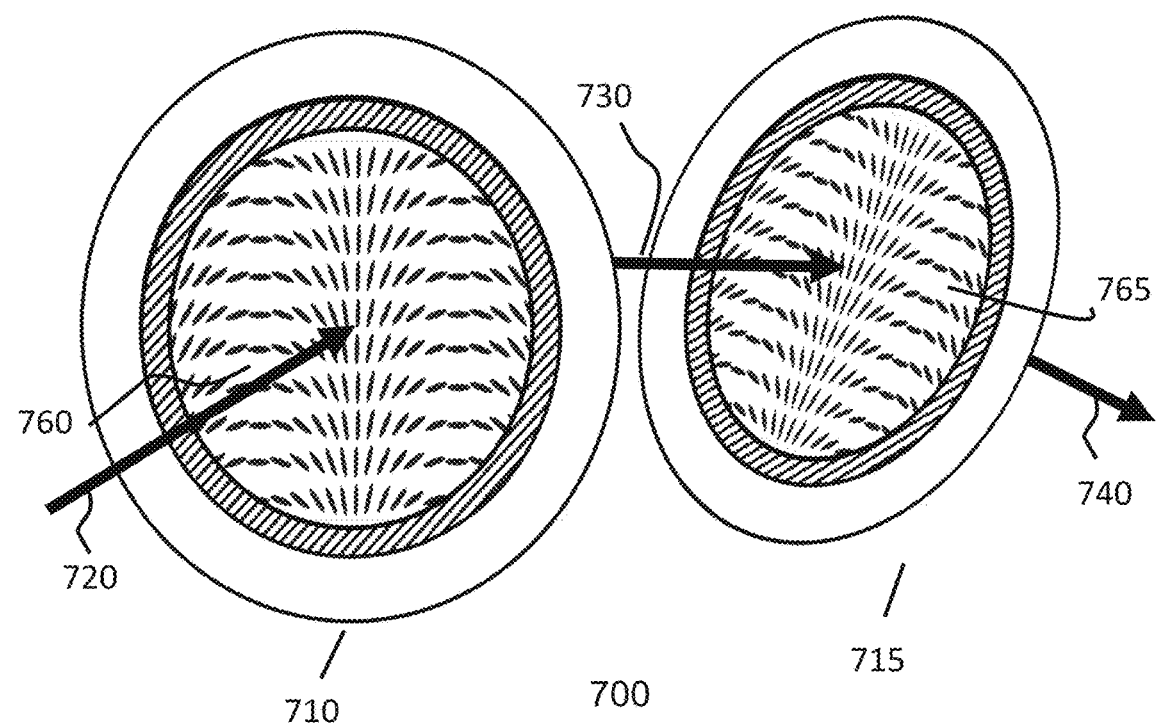

FIG. 7A shows schematically a diffractive beam steering system 700 comprising two diffractive beam deflectors 710 and 715 with the diffractive optics 760 and 765 of the diffractive beam deflectors mounted in the plane of the rotary actuators. An input optical beam 720 is normally incident onto the plane of the diffractive optic 760 of the first diffractive beam deflector 710. Therefore, the input optical beam 720 propagates along the rotation axis 750 of the first diffractive beam deflector 710. The second diffractive beam deflector 715 is arranged such that its plane makes an angle with respect to the plane of the first diffractive beam deflector 710 that is equal to the diffraction angle of the input beam 720 by the diffractive optic 760 of the first diffractive beam deflector 710. This ensures that the rotation axis 755 of the second diffractive beam deflector 715 is parallel to the propagation direction of the beam 730 deflected by the first diffractive beam deflector 710. FIG. 7B presents another perspective of the drawing shown in FIG. 7A. The second diffractive beam deflector 715 deflects the beam into the output direction 740.

Figure 7C:
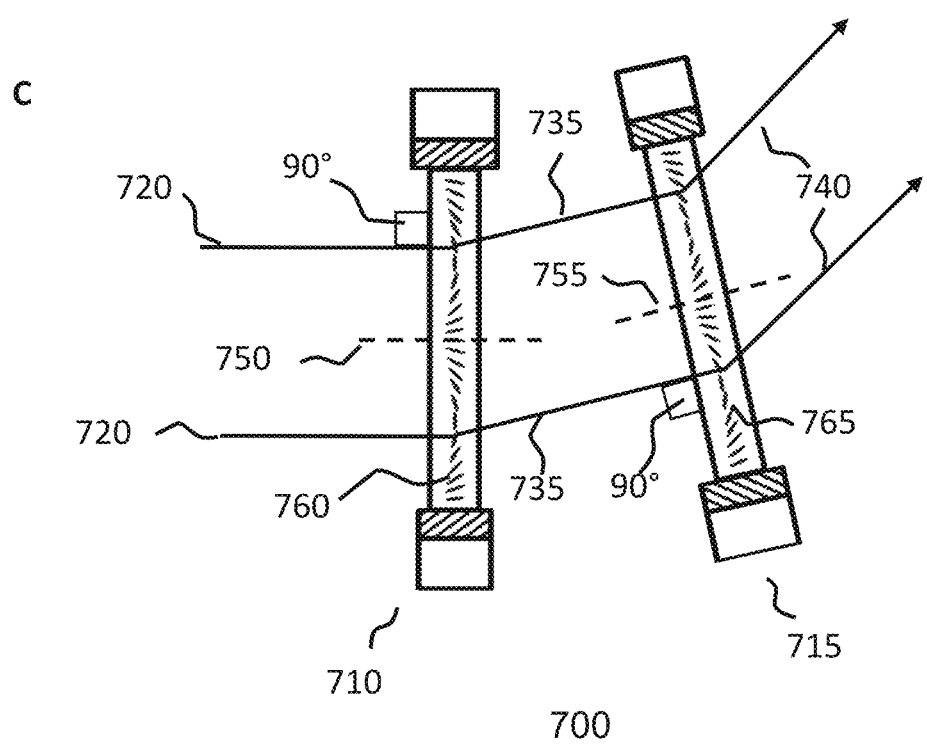

Rotation of the first diffractive beam deflector 710 by the rotary actuator results in changes in diffraction angle. This is demonstrated in FIG. 7C for a 180 degrees rotation of the rotary actuator of the first diffractive beam deflector 710. Hence, to maintain normal incidence of the beam 735 deflected by the first diffractive beam deflector 710 onto the diffractive optic 765 of the second diffractive beam deflector 715, the rotation axis of the second rotary actuator has to be rotated correspondingly around an axis perpendicular to the diffraction plane. In a preferred embodiment, this is achieved by mounting the stator of the second rotary actuator to the rotor of the first rotary actuator as illustrated in FIGS. 8A, B, C and D.

Figure 8A:
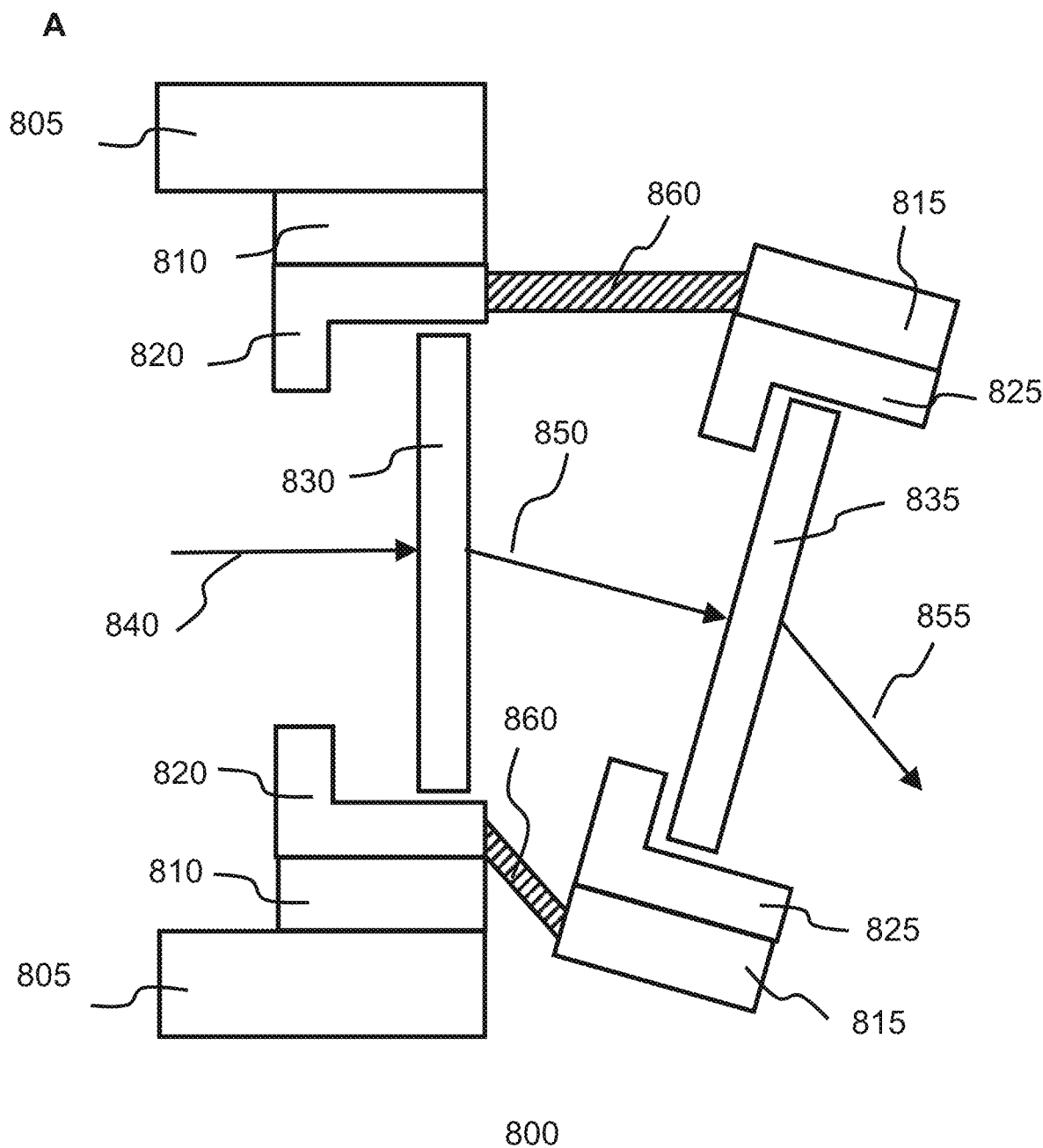
FIG. 8A shows a schematic of a diffractive beam steering system wherein the rotor of the first rotary actuator is fixed to the stator of the second rotary actuator for normal incidence of the optical beam on two diffractive optics.
Figure 8B:
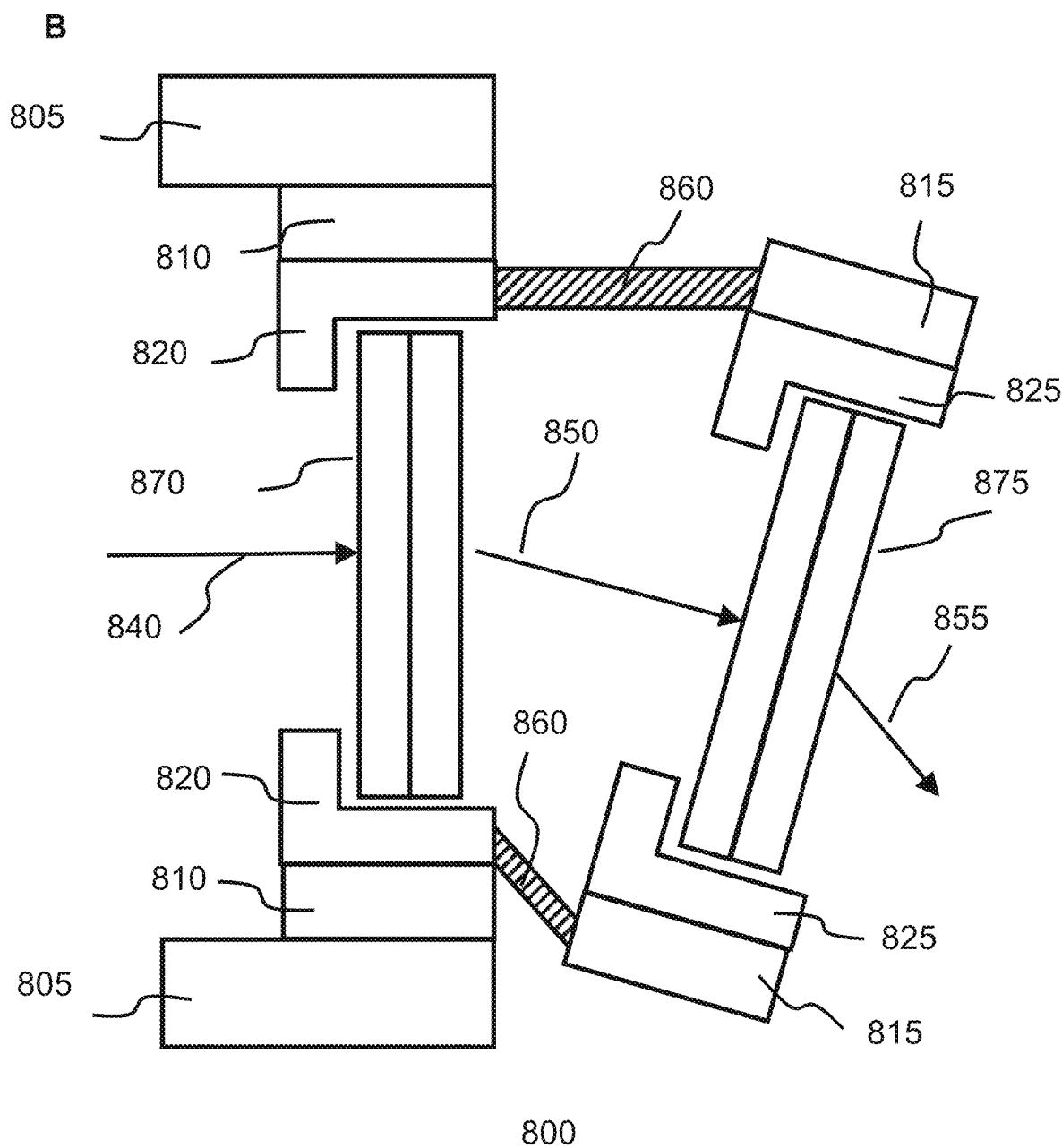
FIG. 8B shows a schematic of a diffractive beam steering system wherein the rotor of the first rotary actuator is fixed to the stator of the second rotary actuator to assure normal incidence of the optical beam onto each of two polarization-independent diffractive optics.
Figure 8C:
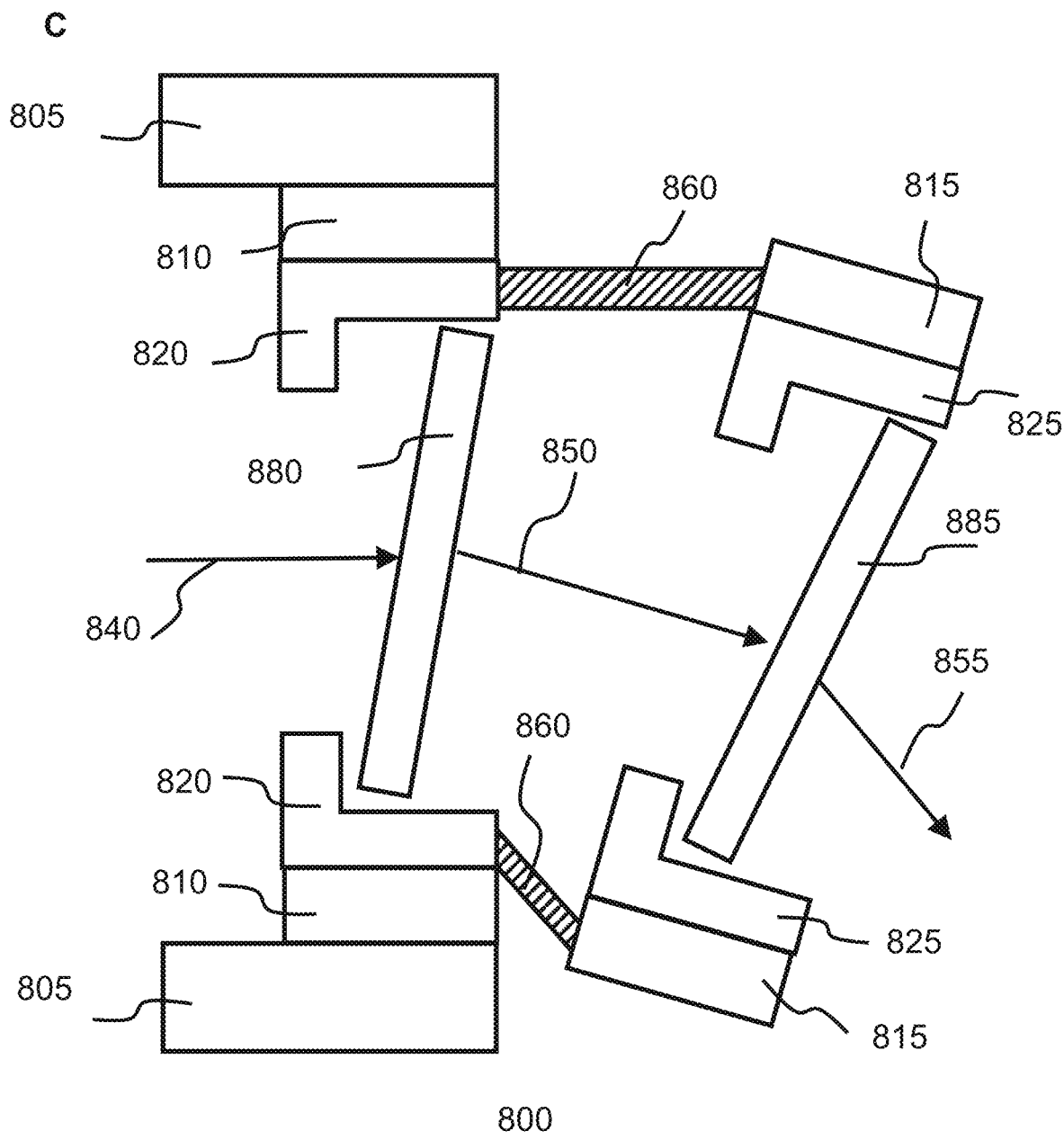
FIG. 8C shows a schematic of a diffractive beam steering system wherein the input optical beam is not normally incident on either the first diffractive optic it encounters or the second diffractive optic it encounters. The angle between the direction of propagation of the beam incident on the first diffractive optic and a line perpendicular to the plane of the first diffractive optic is the same as the angle between the propagation direction of the output beam from the first diffractive optic and a line perpendicular to the plane of the first diffractive optic. The angle between the direction of propagation of the beam incident on the second diffractive optic and a line perpendicular to the plane of the second diffractive optic is the same as the angle between the propagation direction of the output beam from the second diffractive optic and a line perpendicular to the plane of the second diffractive optic.

The difference between the beam steering systems shown in FIGS. 8A and 8C is that the angle of incidence of the beams onto diffractive optics is zero in FIG. 8A and non-zero in FIG. 8C. In either case, as previously discussed, the proposed beam steering system would have greater than approximately 99% efficiency at all pointing angles because the diffractive elements would always be used at the angle of incidence for which they were optimized.

The beam steering system 800 shown in FIG. 8A consists of a mount 805; a first diffractive beam deflector comprising a stator 810, rotor 820, and diffractive optic 830; a second diffractive beam deflector comprising a stator 815, rotor 825, and diffractive optic 835; and a mechanical structure 860 that attaches the stator 815 of the second diffractive beam deflector to the rotor 820 of the first diffractive beam deflector. For the first diffractive beam deflector, the stator 810 is rigidly mounted to the mount 805. The rotational position of rotor 820 is controlled by stator 810. The first diffractive optic 830 is rigidly mounted to rotor 820. For the second diffractive beam deflector, the stator 815 is rigidly mounted to the mechanical structure 860, which in turn is rigidly mounted to rotor 820. The rotational position of rotor 825 is controlled by stator 815. The second diffractive optic 835 is rigidly mounted to rotor 825. The mechanical structure 860 is designed such that the angle between the surface of the second diffractive optic 835 and the surface of the first diffractive optic 830 is equal to the angle through which an optical beam is diffracted by the first diffractive optic 830. This assures that the angle of incidence on the second diffractive optic 835 is zero if the angle of incidence on the first diffractive optic 830 is zero. An optical beam 840 is normally incident on the first diffractive optic 830, and is diffracted into an intermediate beam 850. The intermediate beam 850 is normally incident on the second diffractive optic 835 and is diffracted into an output beam 855. The rotational positions of the rotors 820 and 825 determine the positions and orientations of the diffractive beam optics 830 and 835, and therefore the propagation direction of the output beam 855.

In some embodiments, the diffractive optics comprising CDWs can be optimized for only one polarization of light.

An example of such an embodiment is one in which diffractive optics 830 and 835 in FIG. 8A each consist of a single T-CDW of the type illustrated in FIG. 4 and described in detail in U.S. Pat. No. 11,175,441 to Tabirian et al. As noted in the discussion of FIG. 4, a T-CDW will have greater than approximately 99% diffraction efficiency for one circular polarization of light at normal incidence.

The diffractive beam steering system is optimized for all polarizations of light in an alternative embodiment schematically shown in FIG. 8B. This is achieved, for example, by having the diffractive optics 870 and 875 each comprise a pair of T-CDWs optimized to diffract light of one circular polarization and pass light of the other circular polarization, such that the pair of T-CDWs efficiently diffracts light of any polarization in the same direction. Such a pair of T-CDWs was previously explained in the discussion of FIG. 4.

In another preferred embodiment shown in FIG. 8C, the optics 880 and 885 comprise, for example, U-CDWs, tilted with respect to the planes of respective rotors 820 and 825 such that the input beams and the diffracted beams are at Bragg angle incidence on the U-CDWs. The diffractive optics 880 and 885 in FIG. 8C are designed to have high diffraction efficiency for a predetermined non-normal angle of incidence. In some embodiments, these diffractive optics may be optimized for only one polarization of light. An example of such an embodiment is one in which diffractive optics 880 and 885 in FIG. 8C each consist of a single U-CDW of the type illustrated in FIG. 5 and described in detail in U.S. Pat. No. 11,175,441 to Tabirian et al., which is incorporated by reference in its entirety. As noted in the discussion of FIG. 5, such a U-CDW will have greater than approximately 99% diffraction efficiency for one circular polarization of light at the predetermined non-normal angle of incidence.

Figure 8D:
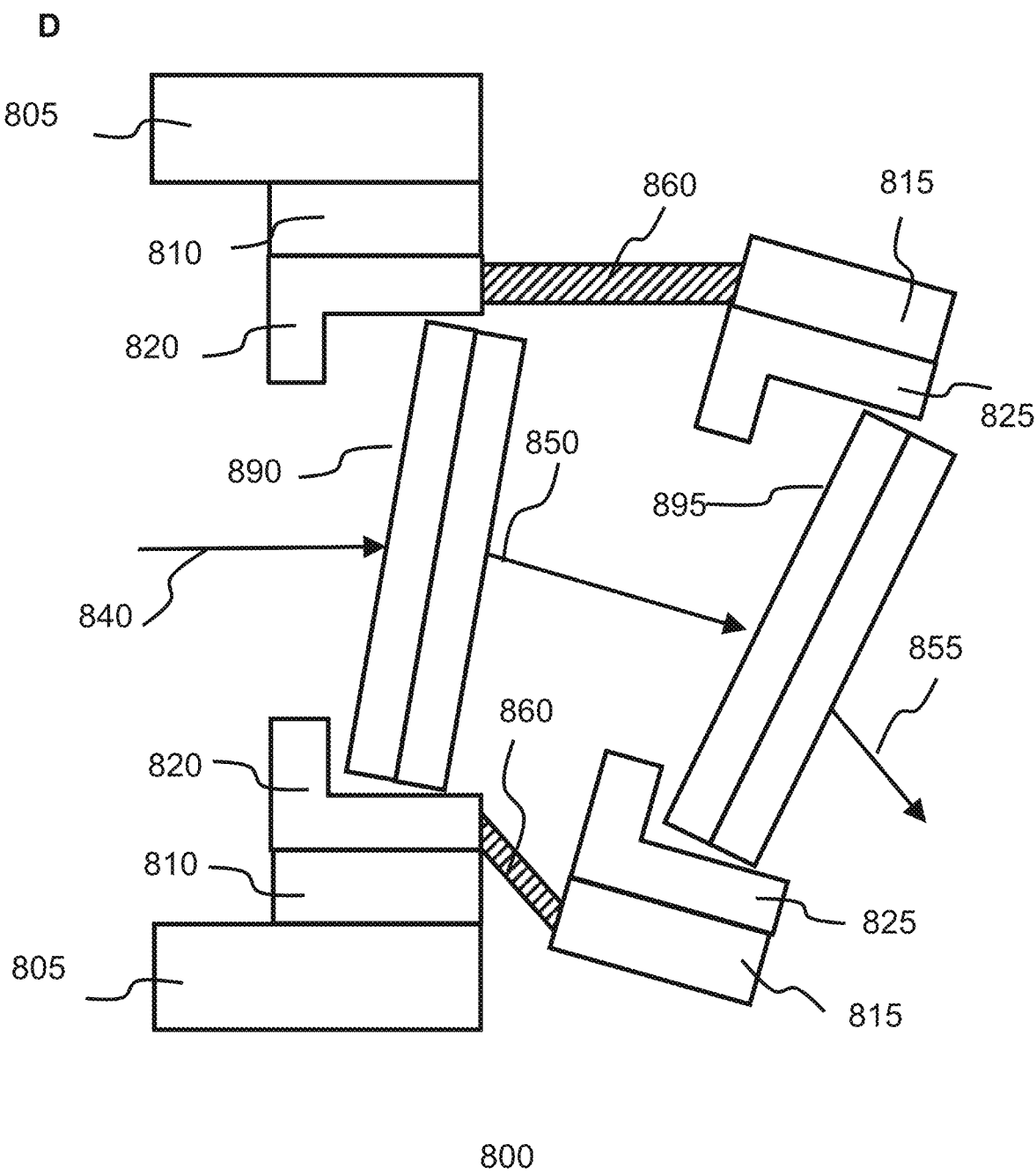
FIG. 8D shows a diffractive beam steering system optimized for non-normal incidence of the optical beam on a polarization-independent diffractive optic.

The diffractive beam steering system is optimized for all polarizations of light in an alternative embodiment schematically shown in FIG. 8D wherein the diffractive optics 890 and 895 each comprise a pair of U-CDWs as illustrated in FIG. 5. Each of the U-CDWs is optimized to diffract light of one circular polarization and pass light of the other circular polarization, such that the pair of U-CDWs efficiently diffracts light of any polarization in the same direction.

Figure 9A:
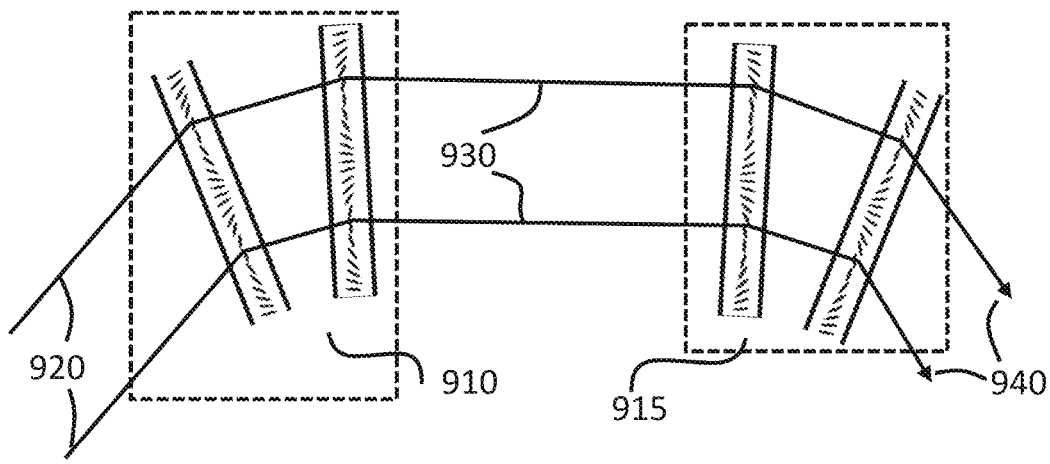
FIG. 9A shows an opto-mechanical assembly comprising two diffractive beam steering systems.
Figure 9B:
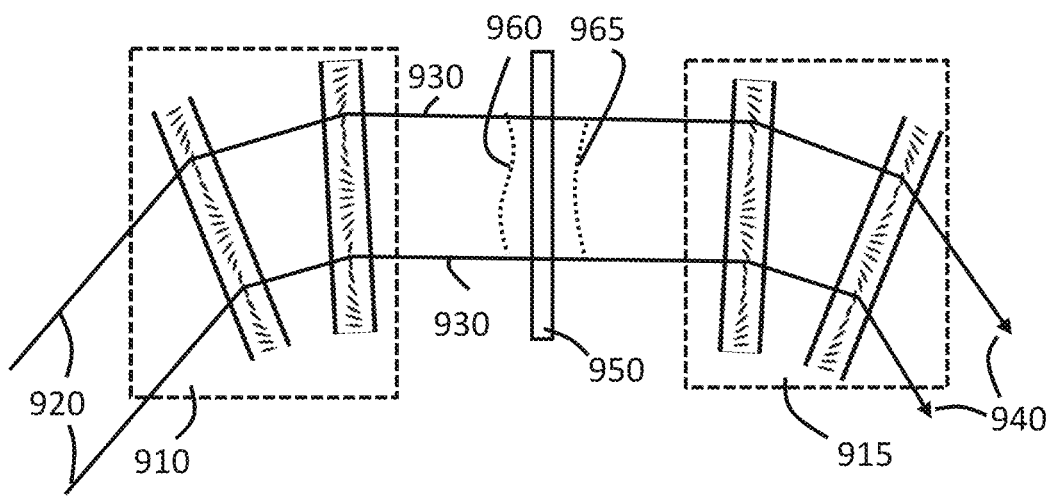
FIG. 9B shows an opto-mechanical assembly comprising optics for controlling beam properties such as shape, phase and polarization.

Diffractive beam steering systems, due to their compact and light-weight structure, can be cascaded to further broaden the range of steering angles. An embodiment of such a cascaded system of two diffractive beam steering systems is shown in FIG. 9A wherein an input optical beam 920 is deflected into the optical beam 930 at the output of the first diffractive beam steering system 910, and the optical beam 930 is further deflected on to the output beam 940 propagated at a predetermined direction. FIG. 9B schematically shows another preferred embodiment further comprising optics 950 for controlling phase and polarization of the optical beam 930. In the example shown in FIG. 9B, a distorted phase 960 of the beam 950 is converted into a concave phase profile 965 for adjusting divergence of the optical beam 930. The optics 950 can comprise, as an example, a system of lenses and mirrors.

One key innovation in the subject invention is that the diffractive beam steering systems are designed such that the angles of incidence on the diffractive beam deflectors are always the same, making it possible to achieve high diffraction efficiency for all possible pointing directions with diffractive optics that only have to be highly efficient at one angle of incidence.

For some applications, however, the diffractive beam deflectors can be optimized to have a predetermined portion of the input optical beam to propagate undiffracted, for example, for the wavefront characterization of the optical beam or for photovoltaic conversion of a portion of the energy of the input optical beam into electrical energy.

Figure 10A:
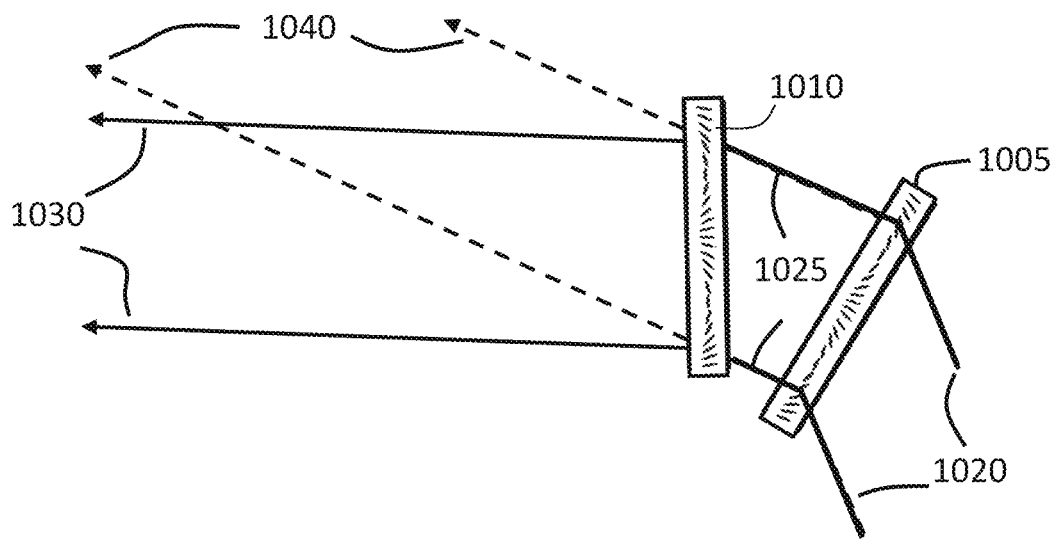
FIG. 10A shows a diffractive beam steering system with an undiffracted portion of an optical beam.

FIG. 10A shows schematically an embodiment of a diffractive beam steering system comprising diffractive beam deflectors 1005 and 1010 optimized such that the diffractive beam deflector 1005 changes the propagation direction of the input optical beam 1020 into the optical beam 1025 incident on the second diffractive beam deflector 1010. The diffractive beam deflector 1010 is optimized not to diffract a predetermined portion of the incident optical beam 1025.

Figure 10B:
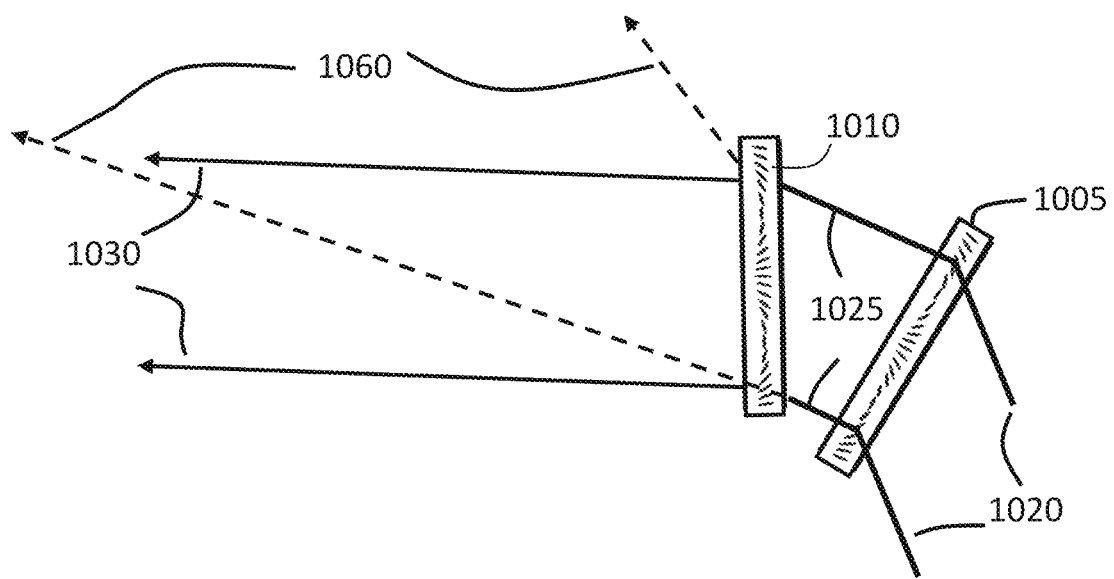
FIG. 10B shows a diffractive beam steering system wherein the undiffracted portion of an optical beam is defocused.

Thus, the diffractive beam deflector 1010, along with the deflected optical beam 1030, outputs an undiffracted optical beam 1040, generally, propagating along the direction of the optical beam 1025 incident on the second diffractive beam deflector 1010. The portion of the undiffracted optical beam 1040 can be predetermined by adjusting any of the parameters that are well known to control diffraction efficiency. Those parameters, particularly, for CDWs, are known to include the thickness of the CDW layers, spatial modulation patterns of the optical birefringence axis, the magnitude of the optical anisotropy, and the alignment of the CDW within the rotary aperture housing the CDWs. In some applications, it may be desirable to have the undiffracted beam defocused which can be done, for example, utilizing a diffractive waveplate lens that defocuses one handedness of circular polarization. The defocused undiffracted beam 1060 is shown in FIG. 10B.

Figure 10C:
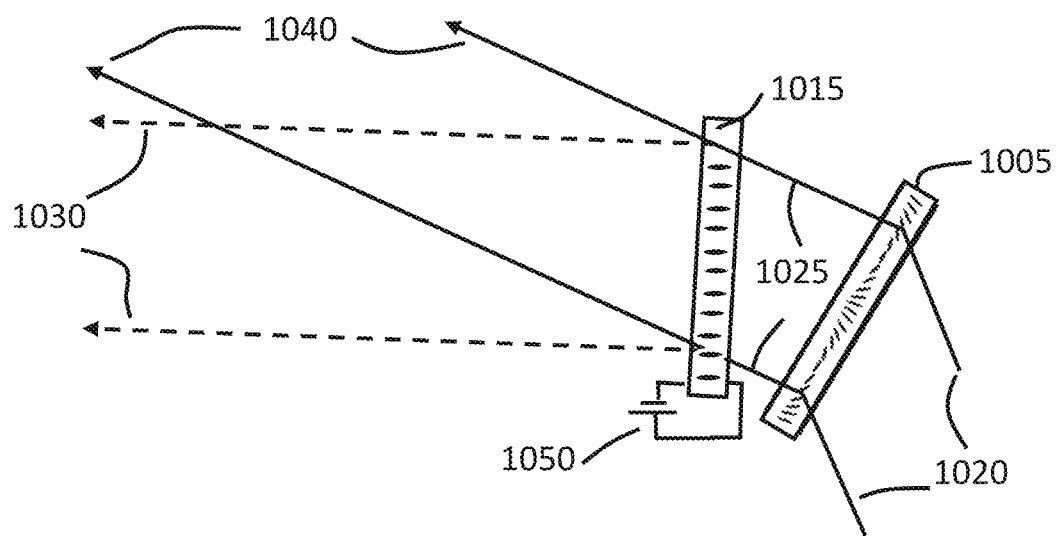
FIG. 10C shows a diffractive beam steering system that includes an electrically switchable diffractive beam deflector.

In another preferred embodiment, the portion of the undiffracted optical beam is controlled electrically instead of having a preset value. In the embodiment schematically shown in FIG. 10C, a function generator 1050 provides an electric field applied, for example directly to the CDW 1015 in FIG. 10B.

The CDW 1015 in this embodiment is made of a liquid crystal material aligning along an electric field applied across the liquid crystal layer. Such an alignment can wash out the cycloidal pattern in the CDW 1015 up to complete elimination of diffraction, or it can detune the diffraction efficiency spectrum from the peak value, as is discussed in detail in the U.S. Pat. No. 11,294,240 to Tabirian et al., which is incorporated by reference in its entirety. Thus, the system can provide for generating both the diffracted beam 1030 as well as the undiffracted beam 1040.

Modifications, additions, or omissions may be made to the systems, apparatuses, and methods described. Although specific advantages have been discussed above, various embodiments may include some, none, or all of the enumerated advantages.

The term "approximately"/"approximate" can be +/−10% of the amount referenced. Additionally, preferred amounts and ranges can include the amounts and ranges referenced without the prefix of being approximately.

Modifications, additions, or omissions may be made to the systems, apparatuses, and methods described herein without departing from the scope of the disclosure. For example, the components of the systems and apparatuses can be integrated or separated. Moreover, the operations of the systems and apparatuses disclosed herein can be performed by more, fewer, or other components and the methods described can include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A diffractive beam steering system that is independent of polarization state and preserves a cross-section of a deflected optical beam and maintains high efficiency for all deflection angles, comprising:

an optical beam;

a system of at least two diffractive beam deflectors, said diffractive beam deflectors each comprising at least two cycloidal diffractive waveplates, one of which diffracting light of one handedness of circular polarization, and another one diffracting light of the opposite handedness of circular polarization;

said at least two diffractive beam deflectors arranged at predetermined angles with respect to each other such that an angle of incidence of the optical beam onto a first diffractive beam deflector is at a Bragg angle for both cycloidal diffractive waveplates constituting the first diffractive beam deflector to maximize efficiency for the propagation direction of an incident beam, and a second diffractive beam deflector is at a Bragg angle for both cycloidal diffractive waveplates constituting the second diffractive beam deflector to have maximum efficiency for the propagation direction of the beam diffracted by the first diffractive beam deflector, and each subsequent beam deflector is optimized to have maximum diffraction efficiency for the beam optical diffracted by each preceding diffractive beam deflector; and means for rotating the at least two diffractive beam deflectors, such that rotation axis of each diffractive beam deflector after the first diffractive beam deflector is parallel to the direction of propagation of the optical beam after each diffractive beam deflector has been diffracted by a previous diffractive beam deflector, for all rotational positions of the previous diffractive beam deflector.

2. The diffractive beam steering system as in claim 1, wherein at least one of the diffractive beam deflectors comprise:

a liquid crystalline material; and means for applying an electric field to the liquid crystalline material.

3. The diffractive beam steering system as in claim 2, wherein at least one of the diffractive beam deflectors is switchable into a non-diffractive state by application of an electric field onto the diffractive beam deflector, comprising a liquid crystal.

4. A diffractive beam steering system as in claim 2, wherein the diffraction efficiency of at least one diffractive beam deflectors comprised of a liquid crystal, that is tunable by application of electric field to a predetermined level.

5. A diffractive beam steering system as in claim 1, wherein an undiffracted portion of the optical beam is defocused.

* * * * *